F. W. AUSTIN.
SEMI-AUTOMATIC STEERING GEAR OPERATING MECHANISM.
APPLICATION FILED OCT. 1, 1915.

1,208,450.

Patented Dec. 12, 1916.
2 SHEETS—SHEET 1.

Witnesses

F. W. Austin   Inventor by   Attorneys

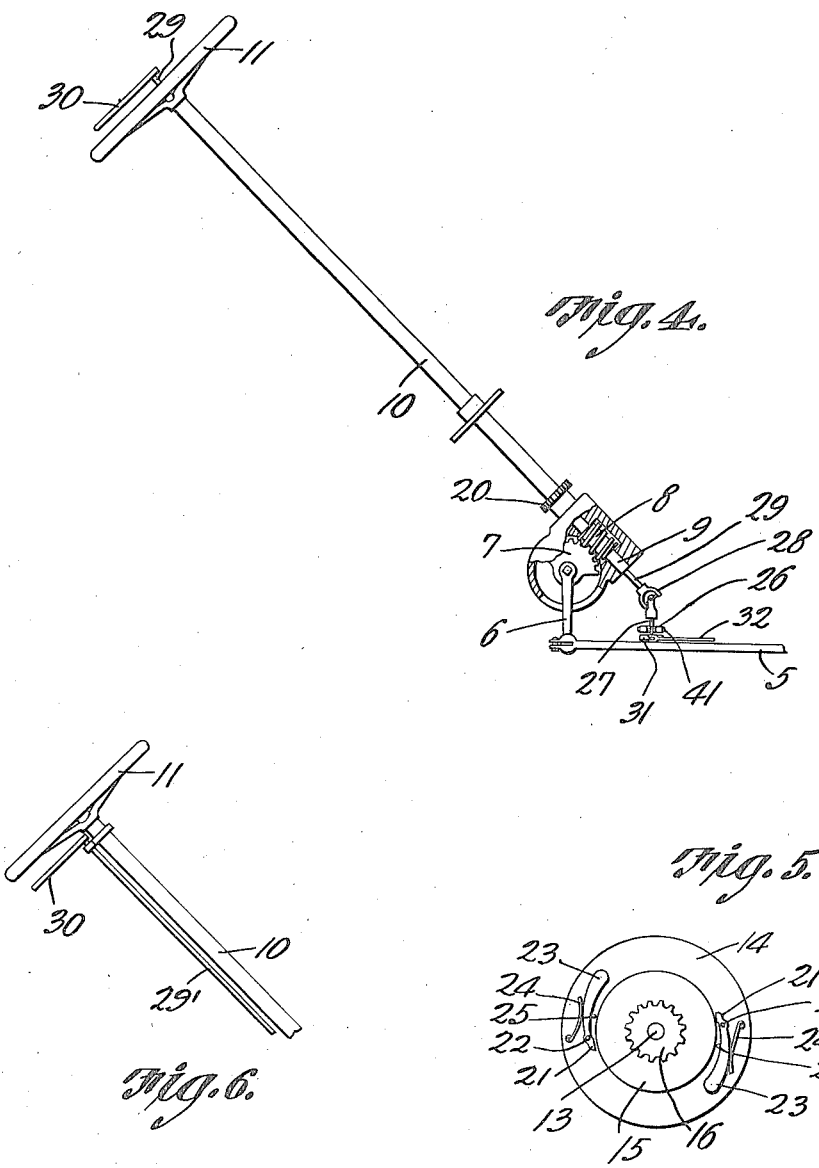

UNITED STATES PATENT OFFICE.

FRANK W. AUSTIN, OF CABOOL, MISSOURI.

SEMI-AUTOMATIC STEERING-GEAR-OPERATING MECHANISM.

1,208,450. Specification of Letters Patent. Patented Dec. 12, 1916.

Application filed October 1, 1915. Serial No. 53,564.

*To all whom it may concern:*

Be it known that I, FRANK W. AUSTIN, a citizen of the United States, residing at Cabool, in the county of Texas and State of Missouri, have invented a new and useful Semi-Automatic Steering-Gear-Operating Mechanism, of which the following is a specification.

This invention is a mechanism for operating the steering gear of an automobile or motor vehicle, although the mechanism may be used for actuating a boat rudder, airship rudder, gun carriage, crane boom, or other kindred device, the mechanism being designed for relieving the operator of the burden of manually operating the steering gear, it only being necessary for the operator to manipulate an easily movable handle which will set the mechanism into motion for actuating the steering gear in the desired manner.

One of the objects of the invention is the provision of a novel and improved mechanism of the nature indicated adapted to be installed upon various automobiles or motor vehicles, and which will allow the steering shaft to be rotated as usual by means of the hand wheel when desired.

Another object of the invention is the provision of a mechanism of the nature indicated embodying electric motors or other actuating means operatively connected to the steering gear, and manually operable means whereby the actuating means can be conveniently brought into play for actuating the steering gear to move the steering wheels either in one direction or the other for purpose of steering the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
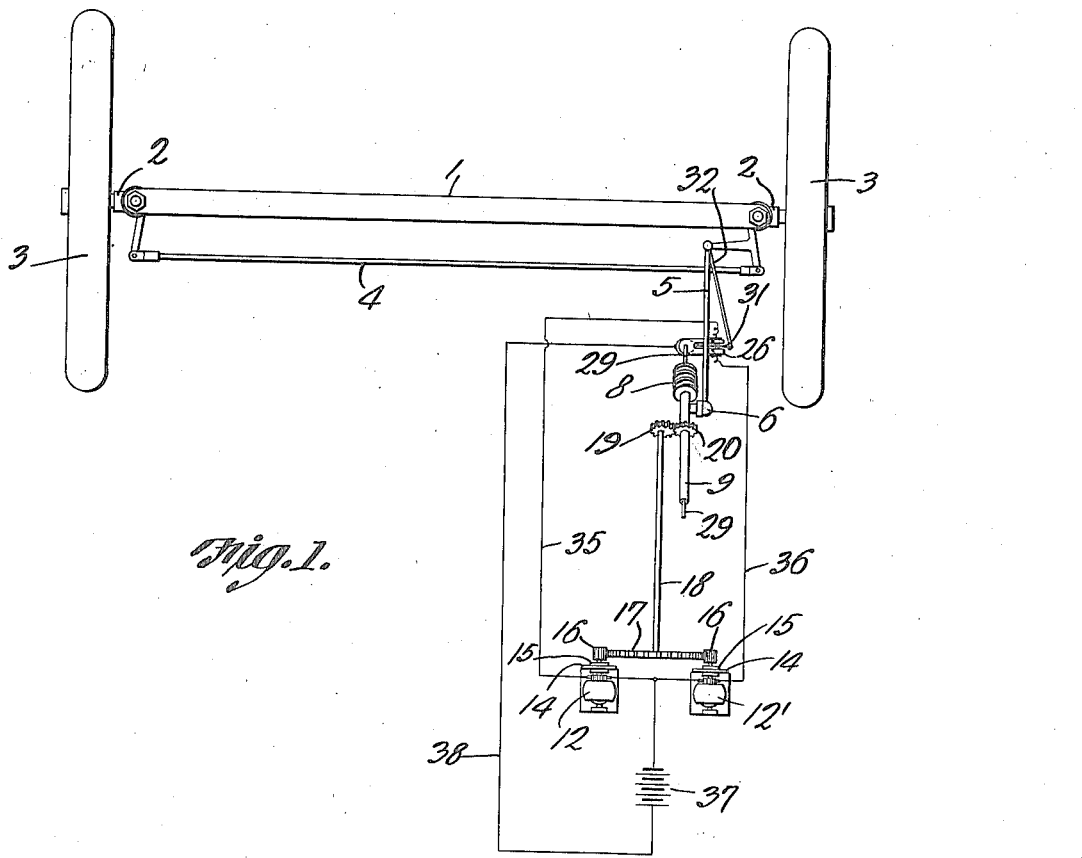
Figure 2:
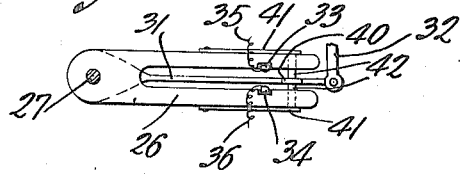
Figure 3:
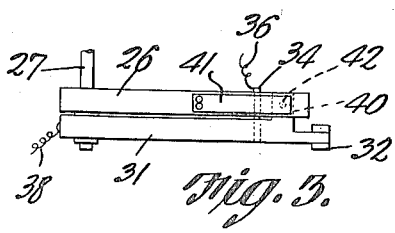

Figure 1 is a diagrammatical view of the mechanism applied to the steering gear of a motor vehicle. Fig. 2 is a plan view of the switch for controlling the electrical circuits. Fig. 3 is a side elevation of the switch. Fig. 4 is a side elevation of a fragmental portion of the steering gear, portions being shown in section and the switch and its controlling means being applied thereto. Fig. 5 is an enlarged elevation of the centrifugal clutch of one motor. Fig. 6 is a fragmental elevation illustrating a modification.

The steering gear of the automobile or motor vehicle embodies, as usual, the front axle 1 to the ends of which the knuckles 2 are pivoted, the front wheels 3 being journaled upon the knuckles and the knuckles being connected by a rod 4 so as to swing in unison. One of the knuckles is connected by means of a link or rod 5 with the depending arm 6 which is secured to a worm wheel 7 meshing with a worm 8 keyed upon the inclined steering shaft 9 extending through the inclined tubular casing or standard 10. The usual hand wheel 11 is secured upon the upper end of the shaft 9, whereby the wheels 3 may be angled by rotating the hand wheel.

The present mechanism is illustrated as being applied to the above steering gear, although it will be understood at the outset, that the mechanism may be applied upon various motor vehicles and other devices for which the mechanism is suited.

The present mechanism embodies a pair of electric motors or prime movers 12 and 12' carried by the vehicle at any suitable point thereof, and the armatures of the two motors are arranged to rotate in opposite directions when the motors are operated. Carried by the armature shaft 13 of each motor is a disk 14 keyed or otherwise secured to the shaft, and a wheel 15 of smaller diameter than the disk is mounted loosely upon the shaft adjacent the disk. A relatively small gear wheel or pinion 16 is secured to each wheel 15, and the two pinions 16 intermesh with a relatively large gear wheel 17 having attached thereto one end of a shaft or suitable connection 18, the other end of which is attached to a gear 19 intermeshing with a gear 20 keyed or otherwise secured upon the steering shaft 9 at any suitable point thereof, preferably adjacent the lower end of the steering shaft.

Since the wheels 15 are loose upon the armature shafts 13, the steering shaft 9 may ordinarily be rotated for operating the steering gear without interference, since when the shaft 18 is rotated due to the rotation of the shaft 9, the gear wheel 17 and pinions 16 can rotate without interference or without rotating the armatures. This allows the steering gear to be operated in the ordinary manner when desired or necessary.

The centrifugal clutch is employed for connecting each armature with the respective wheel 15 when the corresponding motor is operated, and to this end, a plurality of dogs 21 are pivoted, as at 22, to one side of the disk 14 and are arranged to bite or grip the periphery of the respective wheel 15, the dogs 21 being normally spaced from the wheel to allow the wheel to rotate freely. These dogs 21 are provided with weighted arms 23 projecting therefrom, and normally swung inwardly or toward the wheel 15 by means of leaf springs 24 carried by the disk 14, the inward movement of the arms 23 being limited by stops 25 carried by the disks 14. When the disk 14 is rotated due to the rotation of the armature, the arms 23 are thrown or swung outwardly by centrifugal action, thus swinging the dogs 21 forcibly against the periphery of the respective wheel 15, and causing the wheel 15 to be rotated with the disk 14. The centrifugal clutches ordinarily disconnect the armatures from the steering gear when the motors are idle, and when one motor is operated, the armature thereof is connected automatically with the steering gear by means of the respective centrifugal clutch.

The switch for controlling the motor circuits embodies a U-shaped member 26 having its bend secured upon a short vertical shaft 27 which has its upper end connected by means of the universal joint 28 with a switch-operating shaft 29 extending through the tubular steering shaft 9. The upper protruding end of the shaft 29 is provided with a suitable handle 30 whereby the handle 30 can be swung conveniently by the hand of the operator, to correspondingly swing the member 26. An arm 31 has one end loosely embracing the shaft 27 below the member 26, and the free end of the arm 31 is connected by means of a link or tie member 32 with the pivot of the link 5 and respective knuckle 2, so that when the steering wheel 11 is turned to the right and left, the handle 30 will be swung correspondingly.

Secured to the adjacent sides of the limbs or branches of the member 26 is a pair of insulated contacts 33 and 34 which are disposed opposite to one another and which project to the opposite sides of the arm or member 31. The contact 33 is connected by a conductor 35 with one terminal of the motor 12, and the contact 34 is connected by means of a conductor 36 with one terminal of the motor 12'. The other terminals of the motors are connected with one pole of a battery 37 which may be taken to represent a storage battery, generator or other suitable source of electrical energy for operating the motors. The other pole of the battery 37 is connected by a conductor 38 to the arm 31. Each motor is thus interposed in a circuit, said circuits having a common conductor 38 and battery 37, and the circuits through the motors are controlled individually by the switch.

In order to normally hold the arm 31 between and spaced from the contacts 33—34, the arm 31 is provided with an upstanding ear 40 projecting between the limbs of the member 26, and a pair of leaf springs 41 are secured to the remote sides of the limbs of said member 26 and are provided at their free ends with inwardly projecting pins 42 working through suitable apertures provided in the limbs of the member 26 and bearing at their adjacent ends against the opposite sides of the ear 40. The pins 42 are forced toward one another under the influence of the springs 41, whereby the member 26 is normally held in proper position with respect to the arm 31 to hold the arm 31 between and spaced from the contacts 33—34 to open both of the motor circuits.

The operation of the mechanism is as follows: Instead of rotating the hand wheel 11, which in many cases, especially upon heavy motor vehicles, requires considerable labor, the operator can simply manipulate the handle or actuating member 30, so that the present mechanism relieves the operator of the burden of manually operating the steering gear. When the operator desires to steer the machine toward one side, he swings the handle 30, which moves easily, so that the member 26 is swung to bring the contact 33 into engagement with the switch arm or member 31 to close the corresponding motor circuit. Current will now flow from the battery 37 through the motor 12 conductor 35, contact 33, arm 31, and conductor 38 back to battery, whereby the motor 12 is operated. As soon as said motor is operated, the centrifugal clutch thereof connects the armature of said motor with the pinion 16, and said pinion in rotating will rotate the gear wheel 17 and shaft 18, thereby rotating the steering shaft 9 in the proper direction for angling the steering wheels 3. When the steering wheels have been turned sufficiently, the handle 30 is released or swung back to normal position whereby the member 26 will be swung to normal position for opening the circuit which was just closed, and the motor 12 will therefore be stopped. The centrifugal clutch of the motor 12 will thus disconnect the armature of said motor from the steering gear. When the machine is to be steered in the other direction, the handle 30 is moved in the opposite direction to swing the member 26 so that its contact 34 engages the arm 31 in which event the circuit through the motor 12' will be closed, current flowing from the battery 37 through the motor 12', conductor 36, contact 34, arm 31 and conductor 38 back to battery. The armature of the motor 12' revolves in a direction reverse to that of the motor 12, so that when the motor 12' is operated, the steering gear is moved in the opposite direction for steering the machine accordingly. It is thus an easy matter for the operator to steer the vehicle by simply controlling the handle 30, the mechanism responding quickly due to the opening and closing of the two motor circuits when the handle 30 is operated for operating the switch.

It is to be noted that when the member 26 is swung in one direction, the respective pin 42 continues to bear against the ear 40 of the arm 31, thereby bringing the respective spring 41 under greater tension, so that as soon as the member 26 is released, the same is restored to original position together with the handle 30.

The present mechanism does not interfere with the ordinary operation of the steering gear by rotating the hand wheel 11 when this is desired or necessary.

As illustrated in Fig. 6, the switch controlling shaft 29' can be mounted upon the outside of the casing 10 instead of within the same. In fact, the switch operating means may be located at any suitable point of the vehicle where it can be operated conveniently.

Having thus described the invention, what is claimed as new is:

The combination with a steering gear including a knuckle, of electrically operated means operatively connected therewith, for moving the steering gear in one direction or the other, a manually controlled shaft, a pair of electrical circuits in which said means are disposed, a switch controlling said circuits and embodying a pair of coöperating oscillatory members, one being attached to said shaft, a link connecting the other member and knuckle, said members having contacts, the switch having spring means for normally holding the switch members in place with the contacts separated.

In testimony that I claim the foregoing as my own, I have hereto affixed my signature in the presence of two witnesses.

FRANK W. AUSTIN.

Witnesses:
W. T. NOBLITT,
G. W. DONE.